United States Patent

[11] 3,592,533

| [72] | Inventor | Harold N. Braunhut<br>c/o Honey Toy Industries Inc. 200 Fifth Ave., New York, N.Y. 10010 |
| --- | --- | --- |
| [21] | Appl. No. | 836,412 |
| [22] | Filed | June 25, 1969 |
| [45] | Patented | July 13, 1971 |

[54] OPTICAL DEVICE FOR SIMULATING OPTICAL IMAGES
10 Claims, 4 Drawing Figs.

[52] U.S. Cl. ................................................ 350/321,
350/157, 350/162 R, 351/46
[51] Int. Cl. ........................................................ A63h 33/22
[50] Field of Search............................................ 350/147,
157, 158, 159, 162, 149; 351/49, 45, 46; 161/2,
34; 264/291

[56] References Cited
UNITED STATES PATENTS

| 839,016 | 12/1906 | MacDonald.................. | 350/162 |
| --- | --- | --- | --- |
| 914,904 | 3/1909 | Wiedenbeck................. | 350/162 |
| 2,304,504 | 12/1942 | Metzger et al. ............... | 350/159 UX |
| 2,372,430 | 3/1945 | Kals............................ | 350/159 X |
| 2,515,830 | 7/1950 | Mahler........................ | 350/157 X |
| 2,527,332 | 10/1950 | Raizen......................... | 350/162 X |
| 2,554,864 | 5/1951 | Lloyd .......................... | 350/159 X |
| 2,789,462 | 4/1957 | Forgrave ..................... | 351/49 |

*Primary Examiner*—David Schonberg
*Assistant Examiner*—Paul R. Miller
*Attorney*—Friedman & Goodman ABSTRACT: Optical means for simulating an X-ray image comprising a lens formed of a transparent stressed thermoplastic material.

PATENTED JUL 13 1971

3,592,533

INVENTOR.
HAROLD N. BRAUNHUT
BY Friedman & Goodman
Attorneys

OPTICAL DEVICE FOR SIMULATING OPTICAL IMAGES

BACKGROUND OF THE INVENTION

1. Field of the Invention

The invention relates generally to optical devices and in particular to an optical device which simulates an X-ray image of a particular object either when viewed through the device or photographed by adapting the device to be fitted over a camera.

2. Description Of Prior Art

Devices for producing optical illusions and for simulating various effects such as X-ray images and the appearance of vibrating eyes, for example, when the device is worn, are well known. One such device for simulating X-ray images provides for a light strainer to be interspersed between a pair of opaque lens members, such light straining member including an object such as a feather. Another X-ray-simulating toy is in the form of a camera and similarly a piece of feather is provided between a pair of transparent layers so that the light is deflected thereby which produces a coherent area of not uniform transparency, that is to say, brighter portions being interrupted by narrow, darker lines.

SUMMARY OF THE INVENTION

It is therefore among one of the principal objectives of the invention to provide an optical device which will simulate an X-ray image of the particular object which is viewed or photographed through the device.

In accordance with the invention, there has now been discovered optical means for simulating an X-ray image comprising a lens formed of a transparent stressed thermoplastic material, e.g., polystyrene.

BRIEF DESCRIPTION OF THE DRAWING

The invention will be hereinafter more fully described with reference to the accompanying drawing, in which.

DESCRIPTION OF THE PREFERRED EMBODIMENTS

Figures 1, 2, 3, 4:
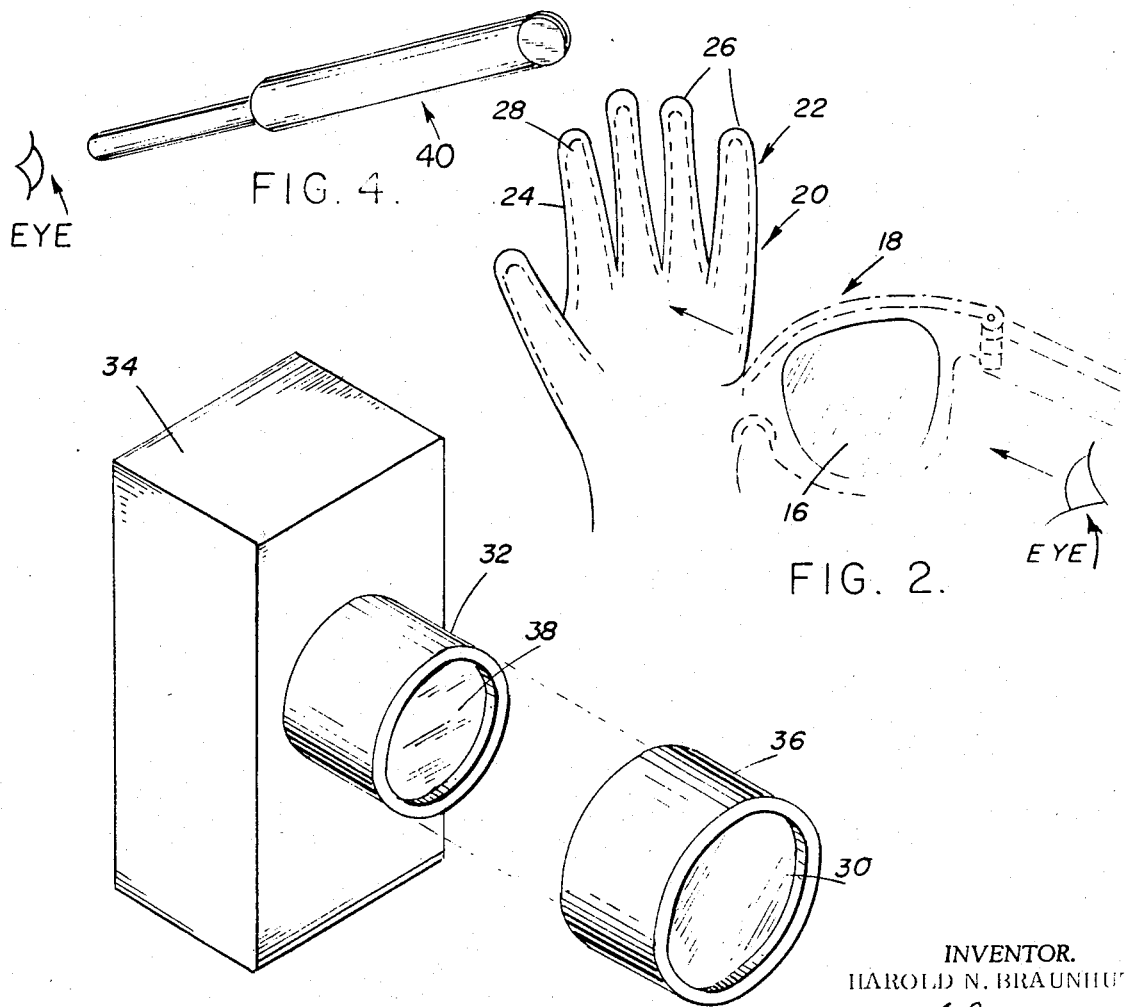
FIG. 1 is a front view showing the inventive optical device as employed for lenses in a pair of eyeglasses.
FIG. 2 is a diagrammatic view showing the image effected when an object is viewed through a pair of eyeglasses having the inventive lens in each eyepiece.
FIG. 3 is a view in perspective showing another embodiment of the invention wherein the inventive optical device is employed as an X-ray adapter for a camera.
FIG. 4 is a view in perspective showing yet another embodiment of the invention wherein the inventive optical device is employed in a telescope.

Referring now to the figures in detail, FIG. 1 shows a conventional pair of eyeglass frames 10 modified according to one form of the invention. There is provided in each eyepiece 12 in the lens opening 14 thereof a lens member 16 formed of a transparent stressed thermoplastic material. The thermoplastic starting material may be polystyrene or the like. The thermoplastic material is stressed by a process including extrusion, and cooling the extrusion melt to the critical temperature below the upper class transition temperature pertaining to the particular thermoplastic material used. This critical temperature will vary with the pressure on the system and thus no exact temperature can be listed; however, the cooling process is well known to the art. Thereafter, the cooled material is stressed until planes of stress are produced in the material as set forth hereinafter below in more detail, for example, by a differential puller known to the art and then the resultant stressed material is quenched. The effect is to provide a stressed material which acts to yield an optical illusion when an object is viewed therethrough, which optical illusion is one simulating an X-ray image. For example, in FIG. 2, there is shown a pair of eyeglasses glasses 18 (in fragmented form) containing the stressed lens members 16 and showing the image 20 produced when an object is viewed through the invention lenses 16. In this particular case, the object viewed is a hand 22 and the effect produced is one simulating an outer lighter area 24 apparently denoting the flesh portion of the fingers 26 of the hand and the inner portion 28 (defined by dotted lines) simulating the bone structure of each finger 26.

It has further been found that the planes of stress produced by the aforementioned process can be employed in various ways. For example, by putting the lenses 14 in the eyepieces 12 in a way such that the planes of stress are in approximate horizontal relation to each other, when the hand to be viewed is held in the upright vertical position, the X-ray image will be apparent, whereas when the hand is held in the horizontal position, the X-ray image will disappear except as to the very tips of the fingers. Also the lenses can be set up so that one is oriented vertically and the other is oriented horizontally as to the stress planes (i.e., at right angles to each other) so that closing one eye will produce still another effect; or two lenses can be provided in each eyepiece with the stress planes at right angles to each other so that when viewed with both eyes simultaneously, will result in a stereoscopic effect, fully rectified, that is, showing transparency completely around the image being viewed, with a dark core or center, clearly defined. It is not known exactly why this optical illusion is produced by our so-called stressed plastic; however, it is postulated that it may have its operative effect grounded in the theory of birefringence. However, it is not our intention to be restricted by any particular theory, since why the phenomenon occurs is not the thrust of the invention but rather it is the discovery that the stressed plastic, as defined, produces this optically illusive effect.

Surprisingly, in yet another form of the invention, it has been found that when a lens 30 formed of the same stressed thermoplastic material, as earlier described, is fitted over the lens holder 32 containing a lens 38 of a conventional camera 34, that the photograph produced will simulate an X-ray picture. In this instance, the lens 30 is fitted into a suitable cylindrical holder 36 which is sized to fit over the camera lens holder 32. Moreover, the optical device can be incorporated into the lens viewer so that when citing the object to be photographed the user may see the image as it will look when photographed.

There is also shown in FIG. 4 yet another instance where the invention can be employed with a telescope 40. Similarly, as earlier described, a lens formed of the aforementioned stressed thermoplastic material is fitted over the lens arrangement of the telescope at one or both ends and the object cited therethrough will simulate an X-ray picture except in a very enlarged form.

Thus, it can be seen that by the discovery of the invention an optical device has been produced which will yield simulated X-ray images of the particular object being either viewed or photographed through the device.

I claim:

1. An optical device comprising at least one lens of stressed thermoplastic material, said lens being transparent, said lens including means for simulating an X-ray image of a particular object when viewed through said device, said means comprising planes of stress provided in said lens.

2. An optical device according to claim 1, wherein said lens is disposed on at least one end of a telescope provided with a lens arrangement, said lens coacting with said lens arrangement to enlarge said simulated X-ray image.

3. An optical device according to claim 1, wherein said thermoplastic material is polystyrene.

4. An eyeglass frame comprising a pair of eyepieces, each of said eyepieces being provided with a lens opening, a lens of stressed thermoplastic material disposed in each lens opening, each lens being transparent, each lens including means for simulating an X-ray image of a particular object when viewed through the lenses, said means comprising planes of stress provided in each of said lenses.

5. An eyeglass frame according to claim 4, wherein said planes of stress of one of said lenses are disposed in a substantially horizontal relationship with said planes of stress of the other of said lenses to simulate said X-ray image when said object is in a vertical position.

6. An eyeglass frame according to claim 4, wherein said planes of stress of one of said lenses are disposed at substantially right angles to said planes of stress of the other of said lenses so that said one lens simulates said X-ray image when said object is in a vertical position with said other lens simulating said X-ray image when said object is in a horizontal position.

7. An eyeglass frame according to claim 4, wherein a pair of said lenses are disposed in each of said lens openings to define a first lens and a second lens for each eyepiece, said planes of stress of said first lens being disposed at substantially right angles to said planes of stress of said second lens for each eyepiece to cause a stereoscopic effect simulating said X-ray image so that a transparency is provided completely around said object being viewed.

8. An eyeglass frame according to claim 4, wherein said thermoplastic material is polystyrene.

9. A device for a camera comprising holder means for fitting over a lens holder of the camera, said holder means being provided with a lens of stressed thermoplastic material, said lens being transparent, said lens including means for simulating an X-ray image of a particular object when photographed by the camera, said lens means comprising planes of stress provided in said lens.

10. A device according to claim 9, wherein said thermoplastic material is polystyrene.